(12) United States Patent
Johnson (10) Patent No.: US 10,894,476 B2
(45) Date of Patent: Jan. 19, 2021

(54) DISPLAY SYSTEM IN A VEHICLE AND A METHOD FOR CONTROL THEREOF

(71) Applicant: Honda Motor Co., Ltd., Tokyo (JP)

(72) Inventor: Brian W. Johnson, San Francisco, CA (US)

(73) Assignee: Honda Motor Co., Ltd., Tokyo (JP)

(*) Notice: Subject to any disclaimer, the term of this patent is extended or adjusted under 35 U.S.C. 154(b) by 148 days.

(21) Appl. No.: 16/181,693

(22) Filed: Nov. 6, 2018

(65) Prior Publication Data

US 2020/0139812 A1 May 7, 2020

(51) Int. Cl.
| | | |
|---|---|---|
| *B60K 35/00* | (2006.01) | |
| *B60K 37/06* | (2006.01) | |
| *G09G 5/00* | (2006.01) | |
| *G09G 5/08* | (2006.01) | |
| *H04N 7/18* | (2006.01) | |
| *G06F 3/0488* | (2013.01) | |

(52) U.S. Cl.
CPC ............ *B60K 35/00* (2013.01); *G06F 3/0488* (2013.01); *B60K 2370/1438* (2019.05); *B60K 2370/186* (2019.05); *B60K 2370/52* (2019.05); *B60K 2370/736* (2019.05); *B60K 2370/739* (2019.05)

(58) Field of Classification Search
CPC .......... B60K 35/00; B60K 37/06; G09G 5/00; G09G 5/08; B60Q 1/26; G06Q 10/06; H04W 76/14; G06F 9/54; G06F 17/30; G01C 22/00; G01C 21/26; H04N 7/18
See application file for complete search history.

(56) References Cited

U.S. PATENT DOCUMENTS

| | | | | |
|---|---|---|---|---|
| 7,239,947 B2* | 7/2007 | Suzuki | ............... | G01C 21/3664 701/36 |
| 9,834,224 B2* | 12/2017 | Gordon | ............... | B60W 30/182 |
| 10,144,290 B2* | 12/2018 | Jang | .................... | G06F 3/04883 |
| 10,264,615 B1* | 4/2019 | Ouyang | ................ | H04W 76/14 |
| 2003/0122782 A1* | 7/2003 | Yamaguchi | ......... | B60R 11/0235 345/158 |
| 2007/0279316 A1* | 12/2007 | Daude | .................. | G08G 1/0962 345/2.1 |
| 2009/0085830 A1* | 4/2009 | Imai | ......................... | H04N 5/45 345/1.1 |
| 2009/0172707 A1* | 7/2009 | Huang | .................. | G06F 3/1423 719/327 |
| 2012/0044337 A1* | 2/2012 | Mauderer | ................. | B60R 1/00 348/77 |

(Continued)

FOREIGN PATENT DOCUMENTS

| | | |
|---|---|---|
| JP | 2006-301830 | 11/2006 |
| JP | 2012180080 | 9/2012 |

*Primary Examiner* — Yuri Kan
(74) *Attorney, Agent, or Firm* — Rankin, Hill & Clark LLP (57) ABSTRACT

A display system in a vehicle, and associated control method, which displays application information on a driver display screen portion and a passenger display screen portion of a vehicle display based on the seating position of the vehicle occupants in the vehicle and the identity of the vehicle occupants requesting the application information be displayed. The display system and method detects a change in the seating position of the vehicle occupants, and in response switches the display of the application information between the driver display screen portion and the passenger display screen portion of the vehicle display.

20 Claims, 5 Drawing Sheets

(56) References Cited

U.S. PATENT DOCUMENTS

| | | | |
|---|---|---|---|
| 2014/0107821 A1* | 4/2014 | Kusaka | G06F 3/0485 700/94 |
| 2015/0242772 A1* | 8/2015 | Backof, II | G06Q 10/0631 705/7.12 |
| 2016/0016473 A1* | 1/2016 | Van Wiemeersch | G01G 19/4142 701/36 |
| 2019/0232860 A1* | 8/2019 | Ferrone | B60Q 1/2615 |

* cited by examiner

DISPLAY SYSTEM IN A VEHICLE AND A METHOD FOR CONTROL THEREOF

BACKGROUND

Vehicle display systems using display screens within a vehicle are very popular. Developments in display screen technology allow for higher quality and larger display screens to be employed in vehicles, in larger numbers. These improved display screens allow for interaction with a vehicle driver and passengers in the vehicle. At the same time, improvements are also being realized in vehicle systems for monitoring the presence and activities of the vehicle driver and passengers.

Accordingly, the vehicle systems for monitoring the presence and activities of the vehicle driver and passengers can be used to control the vehicle display screen(s) to provide an improved user experience.

BRIEF DESCRIPTION

According to one aspect, a display system in a vehicle includes a display and a controller. The display includes a driver display screen portion and a passenger display screen portion. The driver display screen portion is arranged nearer to a driver seat than a passenger seat within the vehicle. The passenger display screen portion is arranged nearer to the passenger seat than the driver seat within the vehicle. The controller includes a processor and controls the display. The controller: receives application information requests initiated by a first vehicle occupant and a second vehicle occupant, and identification information associated with the application information requests; determines a seating position for each of the first vehicle occupant and the second vehicle occupant among the driver seat and the passenger seat based on the identification information; and distinguishes each application information request, based on the identification information, as being one of a request for first application information received from the first vehicle occupant and a request for second application information received from the second vehicle occupant. The controller controls the display to: display the first application information on the driver display screen portion when the seating position of the first vehicle occupant is determined to be in the driver seat, and on the passenger display screen portion when the seating position of the first vehicle occupant is determined to be in the passenger seat; display the second application information on the driver display screen portion when the seating position of the second vehicle occupant is determined to be in the driver seat, and on the passenger display screen portion when the seating position of the second vehicle occupant is determined to be in the passenger seat; and switch the first application information and the second application information from being displayed on one of the driver display screen portion and the passenger display screen portion to the other of the driver display screen portion and the passenger display screen portion when the seating position of the first vehicle occupant and the seating position of the second vehicle occupant are determined to switch between the driver seat and the passenger seat.

According to another aspect, a display system in a vehicle includes a display and a controller. The display includes a driver display screen portion and a passenger display screen portion. The driver display screen portion is arranged nearer to a driver seat than a passenger seat within the vehicle. The passenger display screen portion is arranged nearer to the passenger seat than the driver seat within the vehicle. The controller includes a processor and controls the display. The controller: receives application information requests initiated by a first vehicle occupant and a second vehicle occupant, and identification information associated with the application information requests; determines a seating position for each of the first vehicle occupant and the second vehicle occupant among the driver seat and the passenger seat based on the identification information; distinguishes each application information request, based on the identification information, as being one of a request for first application information received from the first vehicle occupant and a request for second application information received from the second vehicle occupant; and distinguishes each application information request as being one of a request for driving assistance application information and a request for personal application information based on a type of application information requested with the application information request. The controller controls the display to: display the first application information on the driver display screen portion when the seating position of the first vehicle occupant is determined to be in the driver seat, and on the passenger display screen portion when the seating position of the first vehicle occupant is determined to be in the passenger seat; display the second application information on the driver display screen portion when the seating position of the second vehicle occupant is determined to be in the driver seat, and on the passenger display screen portion when the seating position of the second vehicle occupant is determined to be in the passenger seat; when the seating position of the first vehicle occupant and the seating position of the second vehicle occupant are determined to switch between the driver seat and the passenger seat, switch each of the first application information and the second application information from being displayed on one of the driver display screen portion and the passenger display screen portion to the other of the driver display screen portion and the passenger display screen portion for each of the first application information and the second application information distinguished as being personal application information; and when the seating position of the first vehicle occupant and the seating position of the second vehicle occupant are determined to switch between the driver seat and the passenger seat, continue to display the one of the first application information and the second application information being displayed on the driver display screen portion and distinguished as being driving assistance application information on the driver display screen portion, and display the one of the first application information and the second application information being displayed on the driver display screen portion and distinguished as being driving assistance application information on the passenger display screen portion.

According to yet another aspect, a method for controlling a display system in a vehicle includes: receiving requests to display application information from a first vehicle occupant and a second vehicle occupant; distinguishing whether each request to display application information is a request to display first application information received from the first vehicle occupant or a request to display second application information received from the second vehicle occupant; determining a seating position for each of the first vehicle occupant and the second vehicle occupant among a driver seat and a passenger seat; displaying the first application information on: a driver display screen portion of a vehicle display when the first vehicle occupant is determined to be seated in the driver seat; and a passenger display screen portion of the vehicle display when the first vehicle occupant is determined to be seated in the passenger seat; displaying the second application information on: the driver display screen portion of the vehicle display when the second vehicle occupant is determined to be seated in the driver seat; and the passenger display screen portion of the vehicle display when the second vehicle occupant is determined to be seated in the passenger seat; and detecting a switch of the seating position of the first vehicle occupant and the seating position of the second vehicle occupant, and when detected, switching the first application information and the second application information from being displayed on one of the driver display screen portion and the passenger display screen portion to the other of the driver display screen portion and the passenger display screen portion. The driver display screen portion is arranged nearer to the driver seat than the passenger seat within the vehicle, and the passenger display screen portion is arranged nearer to the passenger seat than the driver seat within the vehicle.

DETAILED DESCRIPTION

The following includes definitions of selected terms employed herein. The definitions include various examples and/or forms of components that fall within the scope of a term and that can be used for implementation. The examples are not intended to be limiting. Further, the components discussed herein can be combined, omitted or organized with other components or organized into different architectures.

A "bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a vehicle bus that interconnects components inside a vehicle using protocols such as Media Oriented Systems Transport (MOST), Processor Area network (CAN), Local Interconnect network (LIN), among others.

"Component", as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

A "database," as used herein, is used to refer to a table. In other examples, "database" can be used to refer to a set of tables. In still other examples, "database" can refer to a set of data stores and methods for accessing and/or manipulating those data stores. A database can be stored, for example, at a disk and/or a memory.

A "disk," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

An "input/output device" (I/O device) as used herein can include devices for receiving input and/or devices for outputting data. The input and/or output can be for controlling different vehicle features which include various vehicle components, systems, and subsystems. Specifically, the term "input device" includes, but it not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware based controls, interfaces, touch screens, touch pads or plug and play devices. An "output device" includes, but is not limited to: display devices, and other devices for outputting information and functions.

A "logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

A "memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory can store an operating system that controls or allocates resources of a computing device.

An "operable connection," or a connection by which entities are "operably connected," is one in which signals, physical communications, and/or logical communications can be sent and/or received. An operable connection can include a wireless interface, a physical interface, a data interface, and/or an electrical interface.

A "processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

A "vehicle," as used herein, refers to any moving vehicle that is capable of carrying one or more human occupants and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more human occupants and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more human occupants. Further, the term "vehicle" can include vehicles that are automated or non-automated with pre-determined paths or free-moving vehicles.

A "vehicle display", as used herein can include, but is not limited to, LED display panels, LCD display panels, CRT display, plasma display panels, touch screen displays, among others, that are often found in vehicles to display information about the vehicle. The display can receive input (e.g., touch input, keyboard input, input from various other input devices, etc.) from a user. The display can be located in various locations of the vehicle, for example, on the dashboard or center console. In some embodiments, the display is part of a portable device (e.g., in possession or associated with a vehicle occupant), a navigation system, an infotainment system, among others.

A "portable device", as used herein can include, but is not limited to, a computing device component (e.g., a processor) with circuitry that can be carried by, worn, or attached to a user. In other words, a portable device is a computer that is carried and/or subsumed into the personal space of a user. Portable devices can include a display and various sensors for sensing and determining various parameters of a user, e.g., location, motion, and physiological parameters, among others. Portable devices can have user input (e.g., touch, keyboard) and output functionality. Exemplary portable devices can include, but are not limited to, handheld devices, mobile devices, smart phones, laptops, tablet computers, e-readers, smart watches, smart glasses, clothing, gloves, hats, shirts, jewelry, rings, earrings necklaces, armbands, shoes, earbuds, headphones and personal wellness devices.

Figure 1A:
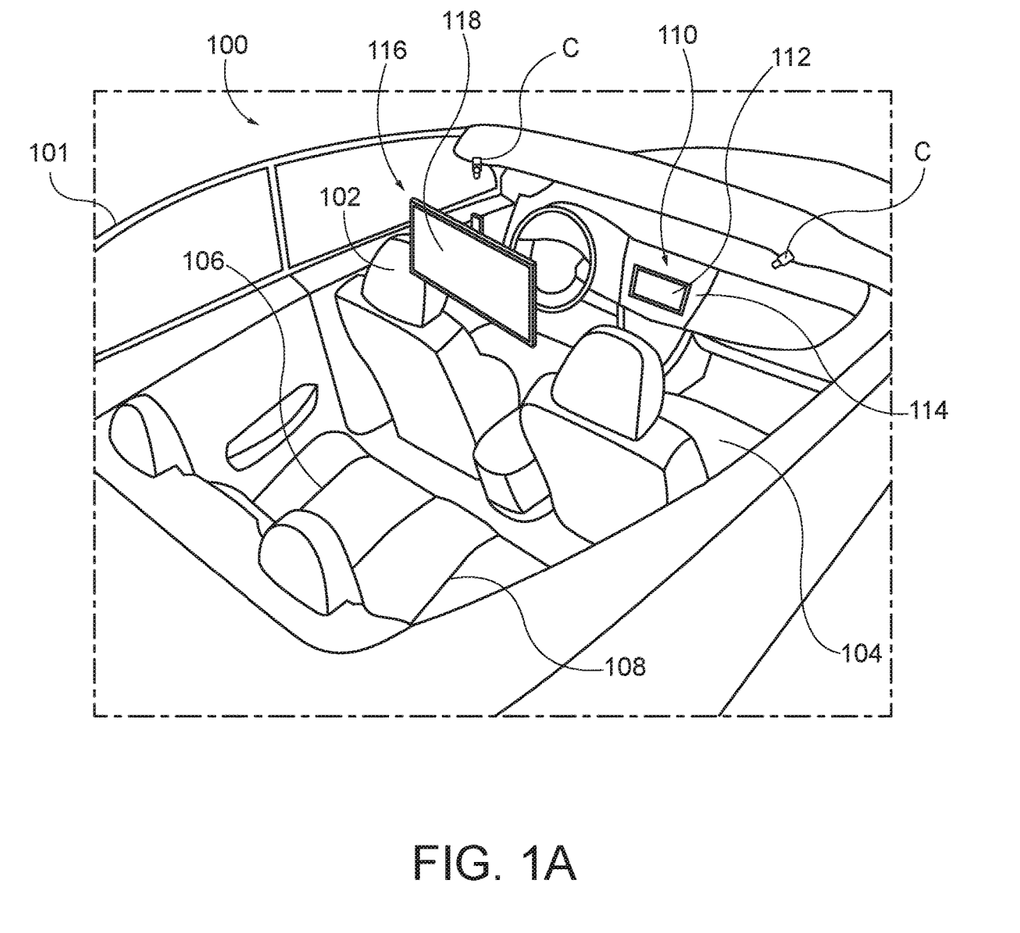
FIG. 1A is a schematic diagram of a first exemplary vehicle cabin, serving as an exemplary environment for implementing the systems and methods for controlling a vehicle display described below.
Figure 1B:
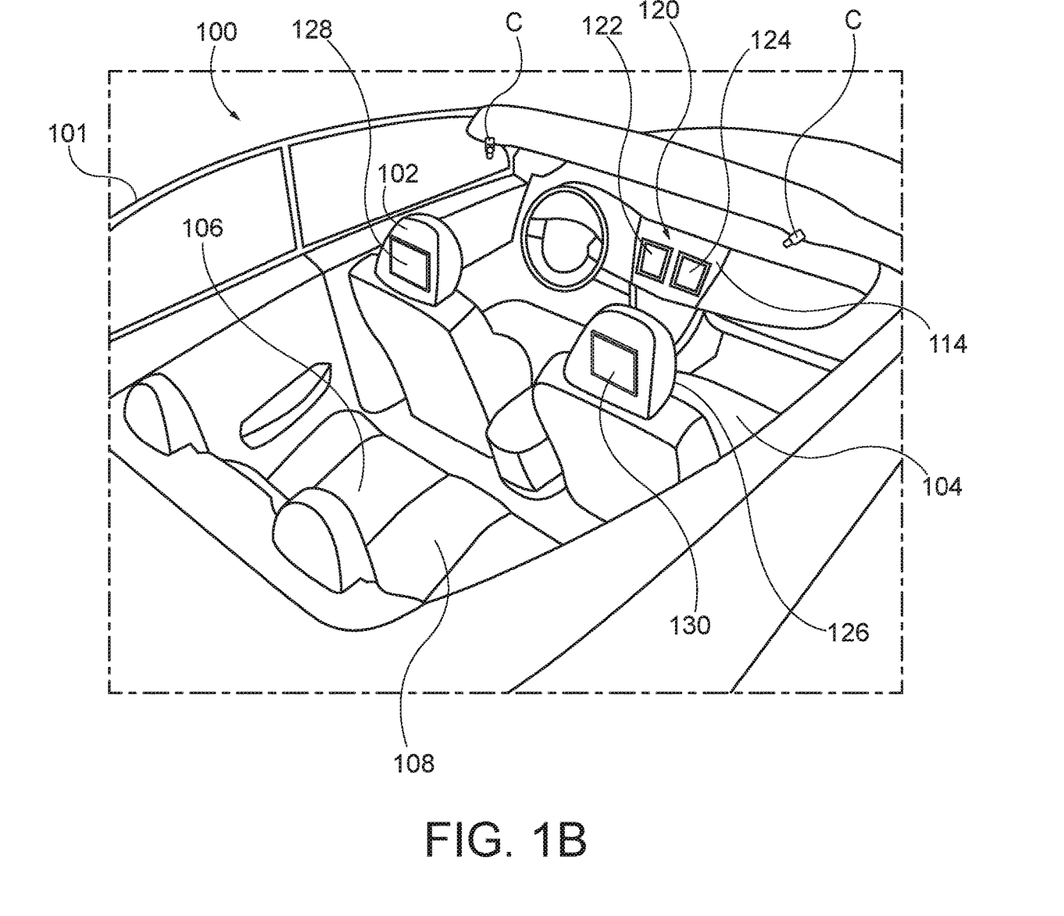
FIG. 1B is a schematic diagram of a second exemplary vehicle cabin, serving as a possible alternative exemplary environment for implementing the systems and methods for controlling a vehicle display described below.

Referring now to the drawings, FIGS. 1A and 1B show first and second exemplary vehicle cabins in which a display system can be incorporated. Common elements between FIGS. 1A and 1B will be labeled with common reference characters.

In FIG. 1A, a vehicle cabin 100 within a vehicle 101 includes a (front) driver seat 102, a (front) passenger seat 104, a driver-side rear seat 106, and a passenger-side rear seat 108. In a front portion of the vehicle cabin 100, a first display 110 constructed as a single display screen 112 is provided in a vehicle dashboard 114. In a rear portion of the vehicle, a second display 116 constructed as a single display screen 118 is provided, e.g., to hingedly hang from a ceiling (not shown) of the vehicle cabin 100.

In FIG. 1B, in place of the first display 110 constructed as the single display screen 112, an alternative first display 120 constructed of two separate display screens 122, 124 which are spaced from each other is provided in the vehicle dashboard 114. In place of the second display 116 constructed as the single display screen 118 hanging from the ceiling of the vehicle cabin 100, an alternative second display 126 constructed of two separate display screens 128, 130 is provided, with each display screen 128, 130 provided in a rear facing portion of one of the driver seat 102 and the passenger seat 104.

It is to be appreciated that the vehicle cabin 100 display configurations shown in FIGS. 1A and 1B are only exemplary. The present application is amenable to any vehicle cabin configuration, with any number of display screens. Such alternative configurations include, but are not limited to, vehicle cabins with three or more rows of seats, vehicle cabins where front seats face rear seats, vehicle cabins where seats are arranged along lateral walls and face forward, rearward, or inward, etc. Furthermore, while the displays are described as being provided using a display screen, the displays can be provided as heads-up or augmented reality-type displays. Additionally, it is possible to mix the display types from FIGS. 1A and 1B, e.g., to provide the first display 112 with the alternative second display 126 or the alternative first display 120 with the second display 116. In vehicle cabins having more than two rows of seats, additional displays can be provided and incorporated into the system described herein.

The vehicle cabin 100 of either embodiment can further include various sensors for capturing and detecting the presence, seating location, and activities of vehicle occupants. For example, cameras C which capture images or detect movements of vehicle occupants may be provided within the vehicle cabin 100. Furthermore, the vehicle 101 may employ seat weight sensors (not shown) for detecting the presence of a vehicle occupant in a seat based on a weight applied to the seat. The vehicle may also include computer-implemented technology for identifying the presence and location of portable devices within the vehicle cabin 100.

The present application will herein-below focus on the first display 110 constructed as the single display screen 112, with reference to vehicle occupants in the driver seat 102 and the passenger seat 104. The first display 110 is hereinafter referenced simply as the display 110. This focus is only to facilitate understanding; it is considered that a person having ordinary skill in the art would readily be enabled to apply the below description to any other or additional displays, e.g., the second display 116, the alternative first display 120, and the alternative second display 126, and with reference to any other or additional vehicle seats, e.g., the driver-side rear seat 106, and the passenger-side rear seat 108.

Figure 2:
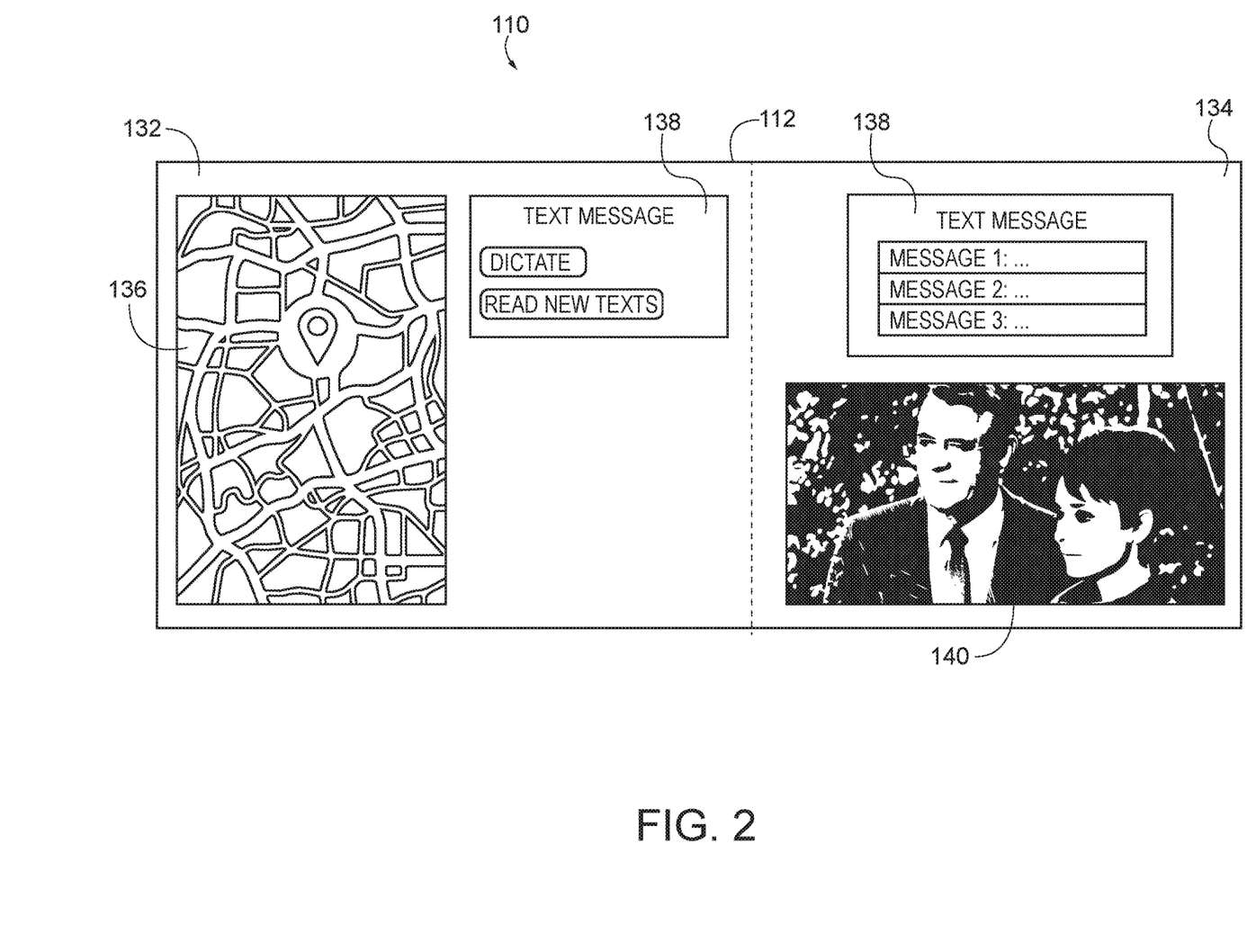
FIG. 2 is a schematic diagram of the vehicle display of FIG. 1A.

Turning to FIG. 2, the display screen 112 of the first display 110 includes a driver display screen portion 132 and a passenger display screen portion 134. The driver display screen portion 132 is intended for the primary use of a vehicle occupant seated in the driver seat 102, and is arranged nearer to the driver seat 102 than the passenger seat 104. The passenger display screen portion 134 is intended for the primary use of a vehicle occupant seated in the passenger seat 102, and is arranged nearer to the passenger seat 104 than the driver seat 102.

For reference, in embodiments where separate display screens are provided in each or either of the front and rear portions of the vehicle cabin 100, e.g., as shown in FIG. 1B, each separate display screen 122, 124 can constitute one of the driver display screen portion 132 and the passenger display screen portion 134. Furthermore, the second display 116 and the alternative second display 126 can be similarly configured to provide separate driver-side and passenger side display screen portions (not shown). The purpose is for each vehicle occupant to have a dedicated display screen portion, which may be a part of a shared display screen or a display screen dedicated to the vehicle occupant.

The display 110 can be a touch-screen display in which the touching of a finger or fingers of a user to the display screen 112 serves as a button press to actuate some function of the display 110, e.g., causes an application to launch and the display 110 to display application information, or allows the user to access some function of the application. The display 110 can alternatively (or additionally) allow the user to interact therewith in a non-contact manner, e.g., via the use of a mechanical component (not shown) that allows for the selection of various options presented on the display 110, via gesture recognition using, e.g., the camera C and the associated support processing, or via voice control using microphones (not shown).

Each of the driver display screen portion 132 and the passenger display screen portion 134 of the display 110 are adapted to display application information. As used herein, application information displayed on the display 110 refers to visual elements of a computer program or software package designed and written to fulfill a particular purpose for a user (i.e., an application). A non-exhaustive list of examples of applications and application information that can be displayed using the display 110 include: navigation applications (navigation application information 136); messaging applications (messaging application information 138); video playing applications (video application information 140); internet browsing applications; social media applications; weather information displaying applications; traffic information displaying applications; news applications; calendar applications; music and podcast playing applications; health management applications; reservation applications; game applications; etc.

Figure 3:
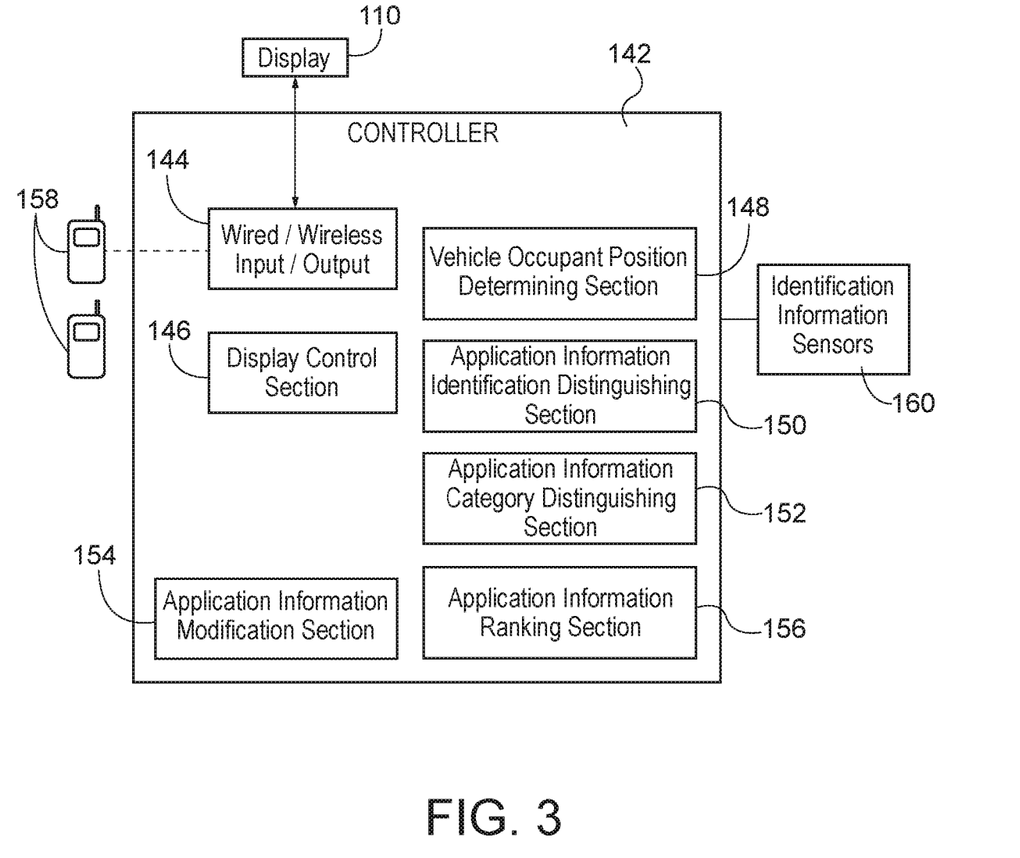
FIG. 3 is a block diagram of an exemplary operating environment for implementing systems and methods for controlling one or more functions associated with the vehicle display in the vehicle.

Turning to FIG. 3, the display 110 is part of a display system that includes and a controller 142 that controls the display 110. The controller 142 is configured of at least one processor with logic circuitry, and can include hardware, firmware, and software architecture frameworks (e.g., kernels, libraries, drivers, APIs) for facilitating data processing with the sections of the controller 142. The controller 142 can wholly or partially be incorporated in a central vehicle electronic control unit (ECU—not shown), and is operably connected in computer communication with various vehicle systems and sensors, as is described in detail below, e.g., via a bus. The controller 142 can, e.g., be implemented via a control program stored on a memory (incorporated in the controller 142 or the vehicle ECU, a computer-readable medium, or a disk) which, when executed by the at least one processor of the controller 142, causes the controller 142 to operate in the manner described below and to implement the various sections of the controller 142 described below.

The controller 142 controls the display 110 to display application information in the driver display screen portion 132 and the passenger display screen portion 134 (and any other display screen portions that may be provided in the vehicle) based on a received request to display application information (an application information request) and, among other possible considerations, a determined seating position of a vehicle occupant that requested the display of the particular application information. To this end, the controller 142 includes a wired/wireless input/output 144, a display control section 146, a vehicle occupant position determining section 148, an application information identification distinguishing section 150, an application information category distinguishing section 152, an application information modification section 154, and an application information ranking section 156. Each of the sections 146-156 of the controller 142 are components of the controller 142, which may be provided using one or more sub-processors or the same one or more processors of the controller 142.

The wired/wireless input/output 144 can include a receiver, a transmitter, and/or a transceiver, for wired and/or wireless (via any known wireless communication protocols) communication with the display 110 and other vehicle systems and sensors. The input/output 144 of the controller 142 may also allow similar wired and/or wireless computer communication with a plurality of portable devices 158, each of which is carried by a vehicle occupant. In this regard, the controller 142 or the vehicle ECU may be specially configured or programmed to allow the portable devices 158 to transmit application information requests, which are then processed for the associated application information to be displayed on the display screen 112.

In the context of the present application, the input/output 144 receives application information requests, e.g., sent from the portable devices 158 or input to the display 110 via the touch-screen or other input mechanisms, and identification information associated with each application information request, which is information that allows the controller 142 to determine the vehicle occupant making each application information request and a seating position thereof. The identification information can be embedded within the application information requests or received from various identification information sensors 160, which are described in detail below.

The display control section 146 receives inputs from each of the vehicle occupant position determining section 148, the application information identification distinguishing section 150, the application information category distinguishing section 152, the application information modification section 154, and the application information ranking section 156, and determines how the display 110 should be controlled to display application information to the vehicle occupants.

Before specifically discussing the other components of the controller 142, description will be given of the identification information, which is collected using the identification information sensors 160. The identification information is information which the controller 142, via its components, can use to determine the vehicle occupant making each application information request and the seating position thereof.

For application information requests made via the portable devices 158, the identification information can be embedded with the application information request and include, e.g., identifying information identifying the vehicle occupant. For example, the identifying information can include the identity of the owner of the portable device 158, which can be part of meta-data sent with the application information request, or the portable device 158 can be pre-registered with the vehicle ECU. Furthermore, via known technological measures, the location of each portable device 158 within the vehicle cabin 100 can be determined based on various signals transmitted from the portable devices 158, e.g., Global Positioning Systems (GPS), etc. In applications in which the portable devices 158 are not associated with a particular vehicle occupant (i.e., the portable devices 158 are not "owned" or registered in any way), the operator of each portable device 158 can be determined using, e.g., facial recognition technology that identifies each vehicle occupant and associates each identified vehicle occupant with the operation of the each portable device 158.

For application information requests made using the portable devices 158, the identification information sensors 160 can include those computer-implemented components used to communicate and process information received from the portable devices 158. For example, the vehicle ECU and any receiver component(s) thereof that receive signals from the portable devices 158 and use the signals to distinguish the vehicle occupants and the seating position thereof, can constitute the identification information sensors 160. Furthermore, the identification information sensors 160 can include the cameras C and whichever components of the controller 142 or the vehicle ECU which are used to perform facial recognition based on inputs of the camera C. It is, however, to be appreciated that some of the processing associated with distinguishing the vehicle occupants and the seating position thereof based on application information requests received from the portable devices 158 may be performed by the controller 142 itself, in which case the identification sensors 160 may only constitute whichever components are necessary for providing the controller 142 with the information necessary to make such distinctions.

For application information requests made via touch-screen or other input mechanisms enabled by the display 110, the identification information can include a profile of each vehicle occupant, a seating position thereof, and an activity thereof. To develop the profile of each vehicle occupant, e.g., the cameras C can capture an image of the vehicle cabin 100, including the vehicle occupants within the vehicle cabin 100. The image can then be transmitted to, e.g., the vehicle ECU or the controller 142 for the performance of facial recognition, via known methods, to identify each vehicle occupant (e.g., in the driver seat 102 and the passenger seat 104). The identity of each vehicle occupant can be stored as the profile (a similar profile can be developed for use in identifying the vehicle occupants when application information requests are made using the portable devices 158, especially when the portable devices 158 are not owned or registered by any specific vehicle occupants). The image, and images subsequently captured by the cameras C, can be used to distinguish seating position of the vehicle occupants based on their respective profiles, e.g., by identifying where in the images the profiles are located, with the position in the images corresponding to positions within the vehicle cabin 100. If the application information requests are made using voice command, the seating position of the vehicle occupants can be determined by analyzing the voice input at the microphone (or array).

The activity of the vehicle occupants can be captured as identification information, e.g., using a motion detection camera, which can be one of the cameras C, to identify which vehicle occupant is interacting with the touch-screen or other input mechanism of the display 110. Alternatively, for touch-screen inputs, identification of which vehicle occupant makes an application information request can be made based on which of the driver display screen portion 134 and the passenger display screen portion 136 receives the touch-screen input.

For application information requests made via touch-screen or other input mechanisms enabled by the display 110, the identification sensors 160 can include image capturing and motion detection cameras C, as well as the touch-screen enabling components that can identify which portion of the touch-screen of the display screen 112 is touched, and the microphone. Again, it is to be appreciated that some of the processing associated with distinguishing the vehicle occupants and the seating position thereof based on application information requests received via touch-screen or other input mechanisms enabled by the display 110 may be performed by the controller 142 itself, in which case the identification sensors 160 may only constitute whichever components are necessary for providing the controller 142 with the information necessary to make such distinctions.

The above-described identification information and associated identification information sensors 160 are considered to be exemplary of the instant description. Other identification information sensors not specifically discussed herein are considered to be within the scope of the present application. Any identification information and the sensors associated with the capture thereof which can be used to control the display 110 in the manner described herein can be used in place of the specifically enumerated identification information and the associated identification information sensors. Moreover, the above measures for identifying vehicle occupants sending application information requests, and their seating positions, can be combined or modified in any known manner.

Returning to the controller 142, on receipt of the identification information from the identification sensors 160 and/or embedded in the application information requests, the vehicle occupant position determining section 148 executes processing, using the identification information, to identify each vehicle occupant and determine their seating position. The vehicle occupant position determining section 148 can determine the seating position of the vehicle occupants continuously or periodically, either at random, pre-set time intervals or upon a triggering event (e.g., the vehicle being placed in park, a door opening, etc.), based on the identification information. For descriptive purposes, an example will be made in which a first vehicle occupant and a second vehicle occupant are within a front portion of the vehicle cabin, i.e., in the driver seat 102 and the passenger seat 104. The vehicle occupant position determining section 148 uses the identification information to determine the seating position of the first and second vehicle occupants.

With reference to the above, the occupant position determining section 148 can use ownership and positional information of the portable devices 158 to identify each vehicle occupant and determine their seating position. The occupant position determining section 148 can, instead, rely on facial recognition and image analysis or voice locating technology to do the same.

The application information identification distinguishing section 150 uses the identification information, which is associated with each application information request made by one of the vehicle occupants, to identify the vehicle occupant making any particular application information request. Returning to the example with the first and second vehicle occupants, the application information identification distinguishing section 150 distinguishes each application information request, based on the identification information, as being one of a request for first application information made by the first vehicle occupant and a request for second application information made by the second vehicle occupant.

The application information identification distinguishing section 150 can make this distinction based on the ownership of the portable device 158 used to make each application information request. The application information identification distinguishing section 150 can, instead, rely on known motion detection technology (using the vehicle occupant profile created based on facial recognition technology) or voice distinguishing technology, to distinguish the vehicle occupant making each application information request.

The application information category distinguishing section 152 includes a database stored on a memory, in which each application available for display on the display 110 is categorized as either being driving assistance application information or personal application information. Driving assistance application information can be the application information useful to the driver in driving the vehicle, e.g., the navigation application information 136, weather information displaying application information, traffic information displaying application information, etc. Personal application information is all other application information, which is for the personal use of the vehicle occupants but not related assisting the driver in driving the vehicle, e.g., the messaging application information 138, the video application information 140, internet browsing application information, social media application information, news application information, calendar application information, music and podcast playing application information, health management application information, reservation application information, game application information, etc.

The vehicle occupant position determining section 148, the application information identification distinguishing section 150, and the application information category distinguishing section 152 direct outputs to the display control section 146. The display control section 146, in turn, controls the display 110 to display application information on a respective one of the driver display screen portion 132 and the passenger display screen portion 134. Generally, the display control section 146 controls the display 110 to display: application information requested by the vehicle occupant seated in the driver seat 102 on the driver display screen portion 132; and application information requested by the vehicle occupant seated in the passenger seat 104 on the passenger display screen portion 134. Furthermore, when there is a switch in vehicle occupant position, e.g., as detected by the vehicle occupant position determining section 146, the display control section 146 controls the display 110 to switch at least the application information categorized as personal application information between the driver display screen portion 132 to the passenger display screen portion 134. Application information categorized as being driving assistance application information, when displayed on the driver display screen portion 132, upon a switch in seating position remains displayed on the driver display screen portion 132, and is also displayed on the passenger display screen portion 134.

The application information modification section 154 communicates with the display control section 146 to modify the application information that is to be displayed on the driver display screen portion 132 to be displayed in a driver mode. In the driver mode, a display type and/or an interaction option associated with the application information is limited relative to a standard mode, which is the mode in which application information is displayed on the passenger display screen portion 134. The distinction between the driver mode and the standard mode is exemplarily shown in FIG. 2, wherein the messaging application information 138 is shown differently on the driver display screen portion 132 than on the passenger display screen portion 134.

Notably and exemplarily, the messaging application information 138 shown on the driver display screen portion 132 does not present any message information. Instead, the application information only presents options for the vehicle occupant in the driver seat 102 to have messages read by the display system (via an audio system, which is not shown), or to send a new message by dictation through the microphone of the display system.

In contrast, the messaging application information 138 shown on the passenger display screen portion 134 shows the text of the messages that have been received. The messaging application information 138 shown on the passenger display screen portion 134 may also allow the vehicle occupant seated in the passenger seat 104 to type new messages, etc. These features can be provided in addition to the message read and dictation options available in the driver mode. Thus, the display type and the interaction options associated with the standard mode are limited in the driver mode.

The application information ranking section 156 includes a database stored on a memory, in which each application available for display on the display 110 is ranked by priority. The ranking may be preset and/or modified by the vehicle occupant(s). The ranking information is communicated to the display control section 146, which controls the display 110 to display application information having a higher ranking in a more prominent position. For example, application information associated with applications having a higher ranking are displayed on the driver display screen portion 132 at a position relatively higher or nearer the driver seat 102 than application information associated with applications having a lower ranking, and application information associated with applications having a higher ranking are displayed on the passenger display screen portion 134 at a position relatively higher or nearer the passenger seat 104 than application information associated with applications having a lower ranking.

Using the exemplary display screen 112 shown in FIG. 2, the navigation application information 136 is given a higher ranking than messaging application information 138, and is therefore displayed at a position nearer the driver seat 102 on the driver display screen portion 132. The messaging application information 138 has a higher ranking than the video application information 140, and is therefore displayed at a relatively higher position on the passenger display screen portion 134.

Figure 4:
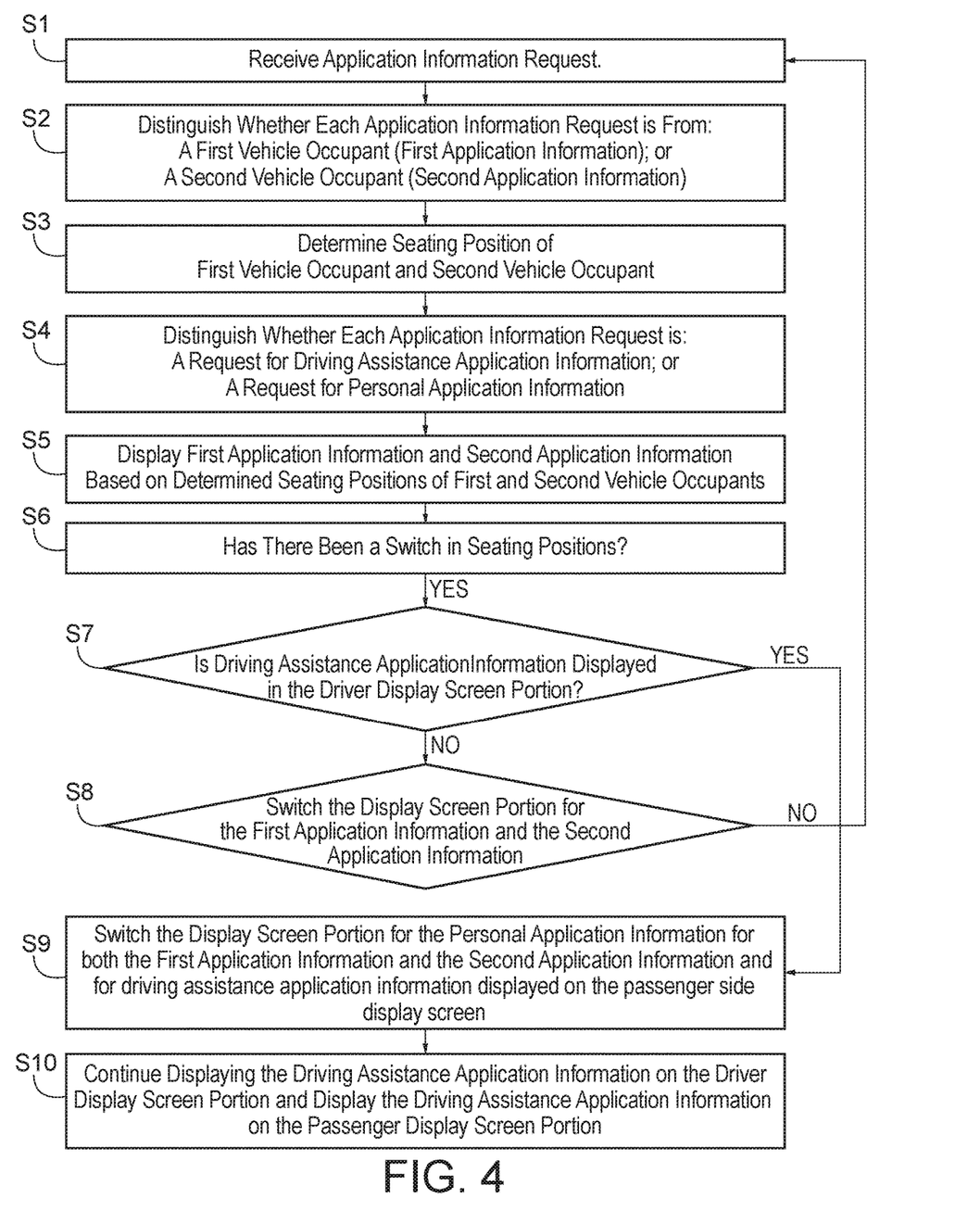
FIG. 4 is a flow chart showing a method for controlling the vehicle display in the vehicle.

A method for controlling the display 110 will be described below with reference to FIG. 4. The discussion will focus on the exemplary scenario in which the vehicle occupants include a first vehicle occupant and a second vehicle occupant, who may be seated in either of the driver seat 102 and the passenger seat 104, and who share the display screen 112 and the driver display screen portion 132 and the passenger display screen portion 134.

Initially, receipt of an application information request, which is a request to display application information on the display 110, is received by the controller 142 at the input/output 144 (S1). As noted above, the application information request can be received from at least one of the portable devices 158 carried by the vehicle occupants or interaction with the display 110 (e.g., via touch-screen or other input mechanism).

Once received, the controller 142, via the application information identification distinguishing section 148, using the identification information associated with the application information request, will distinguish the vehicle occupant making the application information request (S2). Specifically, the application information identification distinguishing section 148 will distinguish whether the application information request is from the first vehicle occupant or the second vehicle occupant. For ease of reference, application information requests from the first vehicle occupant are termed as requests for first application information, and application information requests from the second vehicle occupant are termed as request for second application information, irrespective of the seating positions of the first and second vehicle occupants. As noted above, the vehicle occupant making any particular application information request can be distinguished based on an analysis of the ownership of the portable devices 158, facial recognition and movement analysis using cameras C, voice recognition using the microphone, etc.

The controller 142, via the vehicle occupant position determining section 148, further determines the seating position of the first and second vehicle occupants among the driver seat 102 and the passenger seat 104 (S3). As noted above, this determination can be made based on an analysis of the ownership and position of the portable devices 158, facial recognition, and movement analysis using cameras C, etc.

The controller 142, via the application information category distinguishing section 152, further determines whether the application information request is for application that is categorized as driving assistance application information or personal application information (S4).

The controller 142 then, via the display control section 146, controls the display 110 to: display the first application information on the driver display screen portion 132 when the first vehicle occupant is determined to be seated in the driver seat 102, and the passenger display screen portion 134 when the first vehicle occupant is determined to be seated in the passenger seat 104; and display the second application information on the driver display screen portion 132 when the second vehicle occupant is determined to be seated in the driver seat 102, and the passenger display screen portion 134 when the second vehicle occupant is determined to be seated in the passenger seat 104 (S5). All application information displayed on the driver display screen portion 132 can be displayed in the driver mode and in accordance with the ranking stored in the application information ranking section 156. All application information displayed on the passenger display screen portion 134 can be displayed in the standard mode and in accordance with the ranking stored in the application information ranking section 156.

Thereafter, the controller 142, via the vehicle occupant position determining section 148, determines whether the seating position of the first and second vehicle occupants has been switched between the driver seat 102 and the passenger seat 104 (S6). This step can be performed continuously, at pre-set time intervals, or upon a triggering event (e.g., the vehicle 101 being placed in park, a vehicle door opening, etc.) If no switch has been made (S6: NO), the method continues to await receipt of application information requests. If a switch has been made (S6: YES), the method continues to determine whether driving assistance application information is being displayed on the driver display screen portion 132 (S7).

If no driving assistance application information is being displayed on the driver display screen portion 132 (S7: NO), then only personal application information is being displayed on the driver display screen portion 132. As such, a switch in the display screen portion among the driver display screen portion 132 and the passenger display screen portion 134 for both the first and second application information is made (S8). In other words, the first application information and the second application information are switched from being displayed on one of the driver display screen portion 132 and the passenger display screen portion 134 to the other of the driver display screen portion 132 and the passenger display screen portion 134.

If driving assistance application information is being displayed on the driver display screen portion 132 (S7: YES), then a switch between the display screen portions among the driver display screen portion 132 and the passenger display screen portion 134 is made for the first and second application information that is categorized as being personal application information, as well as for application information categorized as being driving assistance application information and which is being displayed on the passenger display screen portion 134 (S9). Application information categorized as being driving assistance application information and which is being displayed on the driver display screen portion 132, continues being displayed on the driver display screen portion 132 and is also displayed on the passenger display screen portion 134 (S10). The method then returns to awaiting receipt of application information requests.

It is important to note that when a switch in seating position is determined, and a corresponding switch in the display screen portion among the driver display screen portion 132 and the passenger display screen portion 134 is made, a modification of the application information is made between the driver mode (for application information displayed on the driver display screen portion 132) and the standard mode (for application information displayed on the driver display screen portion 134).

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A display system in a vehicle, comprising:
a display comprising a driver display screen portion and a passenger display screen portion, the driver display screen portion arranged in a direction towards a driver seat within the vehicle, and the passenger display screen portion arranged in a direction towards a passenger seat within the vehicle; and
a controller including a processor, the controller controlling the display,
wherein the controller
receives application information requests made by a first vehicle occupant and a second vehicle occupant, and identification information associated with the application information requests,
determines a seating position for each of the first vehicle occupant and the second vehicle occupant among the driver seat and the passenger seat based on the identification information,
distinguishes each application information request, based on the identification information, as being one of a request for first application information made by the first vehicle occupant and a request for second application information made by the second vehicle occupant, wherein the first application information and the second application information include at least one of: driving assistance application information and personal application information, and
controls the display to:
display the first application information on: the driver display screen portion when the seating position of the first vehicle occupant is determined to be in the driver seat; and the passenger display screen portion when the seating position of the first vehicle occupant is determined to be in the passenger seat;
display the second application information on: the driver display screen portion when the seating position of the second vehicle occupant is determined to be in the driver seat; and the passenger display screen portion when the seating position of the second vehicle occupant is determined to be in the passenger seat; and
switch each of the first application information and the second application information from being displayed on one of the driver display screen portion and the passenger display screen portion to the other of the driver display screen portion and the passenger display screen portion when the seating position of the first vehicle occupant and the seating position of the second vehicle occupant are determined to switch between the driver seat and the passenger seat.

2. The display system according to claim 1, wherein
the controller includes an input, which includes at least one of a receiver and a transceiver, that communicates with an associated first portable device of the first vehicle occupant and an associated second portable device of the second vehicle occupant,
the application information requests are transmitted from the associated first portable device by the first vehicle occupant and the associated second portable device by the second vehicle occupant, and
the identification information includes: position information of the associated first portable device and the associated second portable device within the vehicle; and device request information identifying the associated first portable device and the associated second portable device as having made each of the application information requests.

3. The display system according to claim 1, wherein the display is a touch screen display, the application information requests are made using the touch screen display,
wherein the display system further comprises:
at least one camera disposed within the vehicle for capturing an image of the first vehicle occupant and the second vehicle occupant, and detecting a movement of the first vehicle occupant and the second vehicle occupant in touching the display, the at least one camera in communication with the controller,
wherein the controller receives the image and movement detection from the at least one camera as the identification information, analyzes the image to identify the first vehicle occupant and the second vehicle occupant and to determine the seating position of the first vehicle occupant and the second vehicle occupant among the driver seat and the passenger seat, and analyzes the movement detection to distinguish each application information request as being one of the request for first application information made by the first vehicle occupant and the request for second application information made by the second vehicle occupant.

4. The display system according to claim 1, wherein the controller controls the display to display the first application information and the second application in a driver mode when displayed on the driver display screen portion, and to display the first application information and the second application in a standard mode when displayed on the passenger display screen portion,
wherein at least one of a display type and an interaction option associated with the first application information and the second application information is limited in the driver mode relative to the standard mode.

5. The display system according to claim 1, further comprising:
a memory in which a predetermined ranking of a plurality of applications is stored, the plurality of application being available for display on the display when an associated application information request is made,
wherein applications among the plurality of applications having a higher ranking are displayed on the driver display screen portion at a position that is at least one of higher and in the direction towards the driver seat than applications among the plurality of applications having a lower ranking, and applications among the plurality of applications having the higher ranking are displayed on the passenger display screen portion at a position that is at least one of higher and in the direction towards the passenger seat than applications among the plurality of applications having a lower ranking.

6. The display system according to claim 1, wherein the driver display screen portion and the passenger display screen portion are different portions of a single, common display screen.

7. The display system according to claim 1, wherein the driver display screen portion is formed of a first display screen, and the passenger display screen portion is formed of a second display screen separate and spaced from the first display screen.

8. A display system in a vehicle, comprising:
a display comprising a driver display screen portion and a passenger display screen portion, the driver display screen portion arranged in a direction towards a driver seat within the vehicle, and the passenger display screen portion arranged in a direction towards a passenger seat within the vehicle;

a controller including a processor, the controller controlling the display,
wherein the controller
receives application information requests initiated by a first vehicle occupant and a second vehicle occupant, and identification information associated with the application information requests,
determines a seating position for each of the first vehicle occupant and the second vehicle occupant among the driver seat and the passenger seat based on the identification information,
distinguishes each application information request, based on the identification information, as being one of a request for first application information made by the first vehicle occupant and a request for second application information made by the second vehicle occupant,
distinguishes each application information request as being one of a request for driving assistance application information and a request for personal application information, and
controls the display to:
display the first application information in: the driver display screen portion when seating position of the first vehicle occupant is determined to be in the driver seat; and the passenger display screen portion when seating position the first vehicle occupant is determined to be in the passenger seat;
display the second application information in: the driver display screen portion when seating position of the second vehicle occupant is determined to be in the driver seat; and the passenger display screen portion when the seating position of the second vehicle occupant is determined to be in the passenger seat;
when the seating position of the first vehicle occupant and the seating position of the second vehicle occupant are determined to switch between the driver seat and the passenger seat, switch each of the first application information and the second application information from being displayed on one of the driver display screen portion and the passenger display screen portion to the other of the driver display screen portion and the passenger display screen portion for each of the first application information and the second application information distinguished as being personal application information; and
when the seating position of the first vehicle occupant and the seating position of the second vehicle occupant are determined to switch between the driver seat and the passenger seat, continue to display the one of the first application information and the second application information being displayed on the driver display screen portion and distinguished as being driving assistance application information on the driver display screen portion, and display the one of the first application information and the second application information being displayed on the driver display screen portion and distinguished as being driving assistance application information on the passenger display screen portion.

9. The display system according to claim 8, wherein the controller controls the display to display driving assistance application information on the driver display screen portion at a position on the driver display screen portion in the direction towards the driver seat, wherein the controller controls the display to display personal application information on the driver display screen portion at a position on the driver display screen portion in a direction further away from the driver seat.

10. The display system according to claim 8, wherein the driving assistance application information includes a navigation application which displays a map and selectively provides driving route instructions on the map.

11. The display system according to claim 8, wherein
the controller includes an input, which includes at least one of a receiver and a transceiver, that communicates with an associated first portable device of the first vehicle occupant and an associated second portable device of the second vehicle occupant,
the application information requests are transmitted from the associated first portable device by the first vehicle occupant and the associated second portable device by the second vehicle occupant, and
the identification information includes: position information of the associated first portable device and the associated second portable device within the vehicle; and device request information identifying the associated first portable device and the associated second portable device as having made each of the application information requests.

12. The display system according to claim 8, wherein the display is a touch screen display, the application information requests are made using the touch screen display,
wherein the display system further comprises:
at least one camera disposed within the vehicle for capturing an image of the first vehicle occupant and the second vehicle occupant, and detecting a movement of the first vehicle occupant and the second vehicle occupant in touching the display, the at least one camera in communication with the controller,
wherein the controller receives the image and movement detection from the at least one camera as the identification information, analyzes the image to identify the first vehicle occupant and the second vehicle occupant and to determine the seating position of the first vehicle occupant and the second vehicle occupant among the driver seat and the passenger seat, and analyzes the movement detection to distinguish each application information request as being one of the request for first application information made by the first vehicle occupant and the request for second application information made by the second vehicle occupant.

13. The display system according to claim 8, wherein the controller controls the display to display the first application information and the second application in a driver mode when displayed on the driver display screen portion, and to display the first application information and the second application in a standard mode when displayed in the passenger display screen portion,
wherein at least one of a display type and an interaction option associated with the first application information and the second application information is limited in the driver mode relative to the standard mode.

14. The display system according to claim 8, further comprising:
a memory in which a predetermined ranking of a plurality of applications is stored, the plurality of application being available for display on the display when an associated application information request is made,
wherein applications among the plurality of applications having a higher ranking are displayed on the driver display screen portion at a position that is at least one of higher and in the direction towards the driver seat than applications among the plurality of applications having a lower ranking, and applications among the plurality of applications having the higher ranking are displayed on the passenger display screen portion at a position that is at least one of higher and in the direction towards the passenger seat than applications among the plurality of applications having a lower ranking.

15. The display system according to claim 8, wherein the driver display screen portion and the passenger display screen portion are different portions of a single, common display screen.

16. The display system according to claim 8, wherein the driver display screen portion is formed of a first display screen, and the passenger display screen portion is formed of a second display screen separate and spaced from the first display screen.

17. A method for controlling a display system in a vehicle, comprising:
receiving requests to display application information from a first vehicle occupant and a second vehicle occupant;
distinguishing whether each request to display application information is a request to display first application information received from the first vehicle occupant or a request to display second application information received from the second vehicle occupant, wherein the first application information and the second application information include at least one of: driving assistance application information and personal application information;
determining a seating position for each of the first vehicle occupant and the second vehicle occupant among a driver seat and a passenger seat;
displaying the first application information on: a driver display screen portion of a vehicle display when the first vehicle occupant is determined to be seated in the driver seat; and a passenger display screen portion of the vehicle display when the first vehicle occupant is determined to be seated in the passenger seat;
displaying the second application information on: the driver display screen portion of the vehicle display when the second vehicle occupant is determined to be seated in the driver seat; and the passenger display screen portion of the vehicle display when the second vehicle occupant is determined to be seated in the passenger seat; and
detecting a switch of the seating position of the first vehicle occupant and the seating position of the second vehicle occupant, and when detected, switching the first application information and the second application information from being displayed on one of the driver display screen portion and the passenger display screen portion to the other of the driver display screen portion and the passenger display screen portion,
wherein the driver display screen portion is arranged nearer to the driver seat than the passenger seat within the vehicle, and the passenger display screen portion is arranged nearer to the passenger seat than the driver seat within the vehicle.

18. The method according to claim 17, wherein
the requests to display application information are made by the first vehicle occupant using a first portable device and by the second vehicle occupant using a second portable device,
each request to display application information is distinguished as being the request to display first application information when it is made by the first portable device and the request to display second application information when it is made by the second portable device, and
the seating position is determined for the first vehicle occupant and the second vehicle occupant by detecting a position of the first portable device and the second portable device in the vehicle.

19. The method according to claim 17, wherein
the vehicle display is a touch screen display and the requests to display application information are made using the touch screen display,
the method further includes using at least one camera disposed within the vehicle to capture an image of the first vehicle occupant and the second vehicle occupant, and detect a movement of the first vehicle occupant and the second vehicle occupant in touching the display, analyzing the image to identify the first vehicle occupant and the second vehicle occupant and to determine the seating position of the first vehicle occupant and the second vehicle occupant among the driver seat and the passenger seat, and analyzing the movement detection to distinguish each request to display application information as being one of the request to display first application information made by the first vehicle occupant and the request to display second application information made by the second vehicle occupant.

20. The method according to claim 17, wherein the first application information and the second application, when displayed on the driver display screen portion, is displayed in a driver mode, and, when displayed on the passenger display screen portion, is displayed in a standard mode,
wherein at least one of a display type and an interaction option associated with the first application information and the second application information is limited in the driver mode relative to the standard mode.

* * * * *